United States Patent [19]

Sylvester

[11] Patent Number: 4,458,803

[45] Date of Patent: Jul. 10, 1984

[54] PACKAGING CONVEYOR FOR CYLINDRICAL ARTICLES

[75] Inventor: John D. Sylvester, Garden City, N.Y.

[73] Assignee: Amscomatic, Inc., Long Island City, N.Y.

[21] Appl. No.: 356,612

[22] Filed: Mar. 9, 1982

[51] Int. Cl.³ .............................................. B65G 47/34
[52] U.S. Cl. .................................... 198/457; 198/484
[58] Field of Search .............. 198/457, 483, 484, 606, 198/779, 796; 53/211, 214, 216, 252, 570, 587

[56] References Cited

U.S. PATENT DOCUMENTS 3,760,929  9/1973  Lederer ........................... 198/779 X Primary Examiner—Jeffrey V. Nase
Attorney, Agent, or Firm—Alan H. Levine

[57] ABSTRACT

A packaging conveyor for cylindrical articles serving to maintain cylindrical articles such as stacks of cups or the like in a desired orientation with the longitudinal axis of the cylindrical article maintained perpendicular to the direction of movement of the article along the conveyor. The conveyor is formed as a flight conveyor with a first run of flights spaced apart a distance less than 100% and greater than 25% of the diameter of the cylindrical article to be oriented, so that the cylindrical article will fall partially through the spacing between adjacent flights of this first run. A second run of flights spaced apart a distance less than the spacing between the flights of the first run is mounted for movement with the flights of the first run, receiving oriented articles from the first flight run, so as to raise the level of the articles to lie on a plane along the top of the flights. A pusher member is arranged to move transversely across the conveyor at the end of travel of the oriented articles to discharge them into a desired container.

10 Claims, 6 Drawing Figures

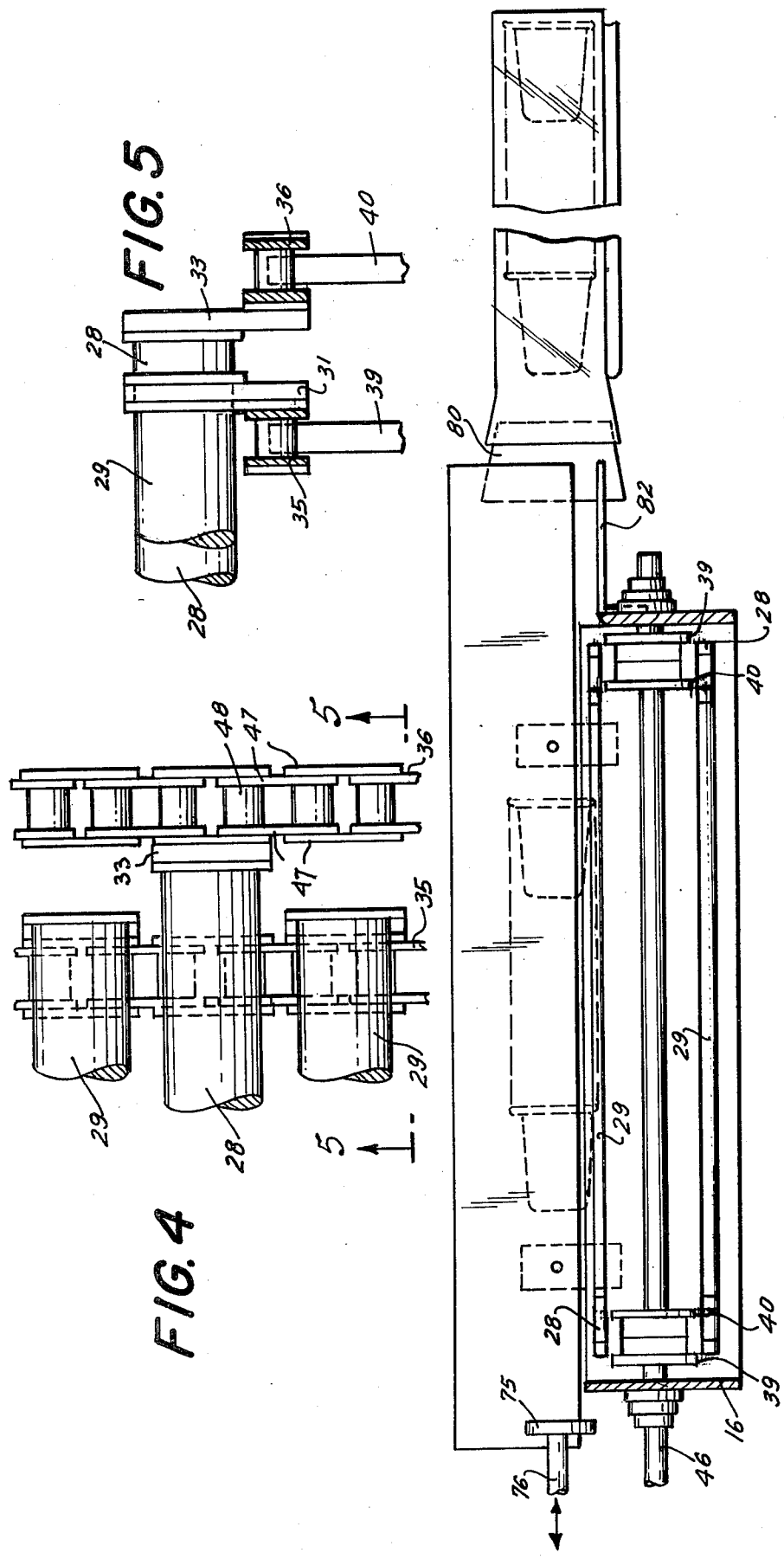

PACKAGING CONVEYOR FOR CYLINDRICAL ARTICLES

BACKGROUND OF THE INVENTION

This invention relates to the art of flight conveyors and more particularly to an orienting conveyor serving to orient elongate cylindrical articles with the axis of the articles perpendicular to the direction of movements of the articles along the conveyor, with the bottom surface of the oriented articles at the end of their movement along the flight conveyor lying in the plane of the upper surface of the flight conveyor, so that the articles may be discharged laterally with respect to the direction of conveyor movement, and will be subject to minimal jarring.

A variety of conveyors have been evolved to facilitate the packaging of cylindrical articles, such for example, as groups of stacked cups or the like. Thus, such stacks of cups or the like cylindrical articles have in the past been moved along a flight conveyor to a point where a pusher member may discharge the stack of cups from the conveyor into a packaging container, such as an envelope or the like.

In order to insure maintenance of these stacks of cups in a desired orientation with the axis of the stack of cups lying perpendicular to the direction of movement of the cups along the conveyor, the conveyor has been designed with flights separated a distance slightly less than the diameter of the cups, so that the stack of cups will fall partially between the space between adjacent flights to orient the stacks of such cups with the axes thereof, perpendicular to the direction of movement of the conveyor.

A problem arises when it is desired to discharge the oriented stacks of cups from the flight conveyor into the desired packaging envelope, in that discharge is generally effected by means of a pusher member arranged at the end of travel of the cups along the flight conveyor. However, the stack of cups having fallen partially between adjacent flights cannot be moved laterally from the conveyor, since the side linkages between flights interfere with lateral movement of the cup stack.

Additionally, when the stacks which have been oriented by falling between adjacent flights hit the conveyor end plate, they will tend to become disoriented on striking the end plate of the conveyor prior to discharge, due to their movement out from between adjacent flights.

BRIEF DESCRIPTION OF THE INVENTION

It is with the above considerations in mind that the present improved conveyor has been evolved, serving to insure desired orientation of cylindrical articles on a flight conveyor with the axes of the conveyed cylindrical articles perpendicular to the direction of movement to the articles on the conveyor, so that the conveyed cylindrical items may readily be dispensed from the conveyor by a pusher member, moving transversely to the conveyor path.

It is accordingly among the primary objects of the invention to provide an improved conveyor for cylindrical articles serving to orient the conveyed articles with the axes of the articles perpendicular to the path of movement thereof.

Another object of the invention is to provide a conveyor for cylindrical articles with means for orienting the articles so that they may readily be dispensed from the conveyor by means of a pusher member moving over the conveyor surface, transverse to the direction of movement of articles on the conveyor.

Another object of the invention is to provide an improved flight conveyor serving to orient cylindrical articles with their axes in a desired position, and with the axis and plane of each article oriented as desired.

A further object of the invention is to provide an orienting conveyor in which after orientation of the objects they will not tend to become disoriented upon striking an end plate on the conveyor.

These and other objects of the invention which will become hereafter apparent are achieved by providing a flight conveyor with two spaced set of flights. A first set of flights is arranged with the spacing slightly less than the diameter of the cylindrical articles to be carried thereby, such that when an article is positioned on the conveyor it will partially fall through the spacing through the flights, so that the articles will be oriented with their axes parallel to those of the flights. A second set of flights is arranged to intermesh with the first set of flights at some point in the path of travel spaced from the end of the conveyor, with said second set of flights spaced apart a distance such as to raise the plane of the cylindrical articles to a level above that of the conveyor links. A pusher member at the end of the path of travel of the conveyor moving laterally across the conveyor discharges the oriented articles. A bagging chute at the side of the conveyor receives the cylindrical articles discharged by the pusher.

A feature of the invention resides in the fact that desired article orientation on a conveyor is accomplished by flight spacing, with relatively wide spacing serving to attain axis orientation. Another feature resides in the use of relatively close flight spacing to raise the level of the oriented articles to facilitate discharge, and providing a relatively smooth surface preventing disorientation of the articles upon striking the conveyor end plate.

BRIEF DESCRIPTION OF THE DRAWINGS

The specific details of a preferred embodiment of the invention, and the manner and process of making and using it, and the best mode contemplated for practicing the invention will be described in full, clear, concise and exact terms, in conjunction with the accompanying drawings, wherein:

FIG. 3 is a cross-sectional elevational view on line 3—3 of FIG. 1 at the discharge station of the conveyor.

FIG. 4 is an enlarged detail in plan view, showing the sidely spaced flights of the first conveyor intermeshing with the relatively narrowly spaced flights of the second conveyor;

FIG. 5 is a cross-sectional view on line 5—5 of FIG. 4; and

DESCRIPTION OF PREFERRED EMBODIMENT OF THE INVENTION

Referring now more particularly to the drawings, like numerals in the various FIGS. will be employed to designate like parts.

Figure 1:
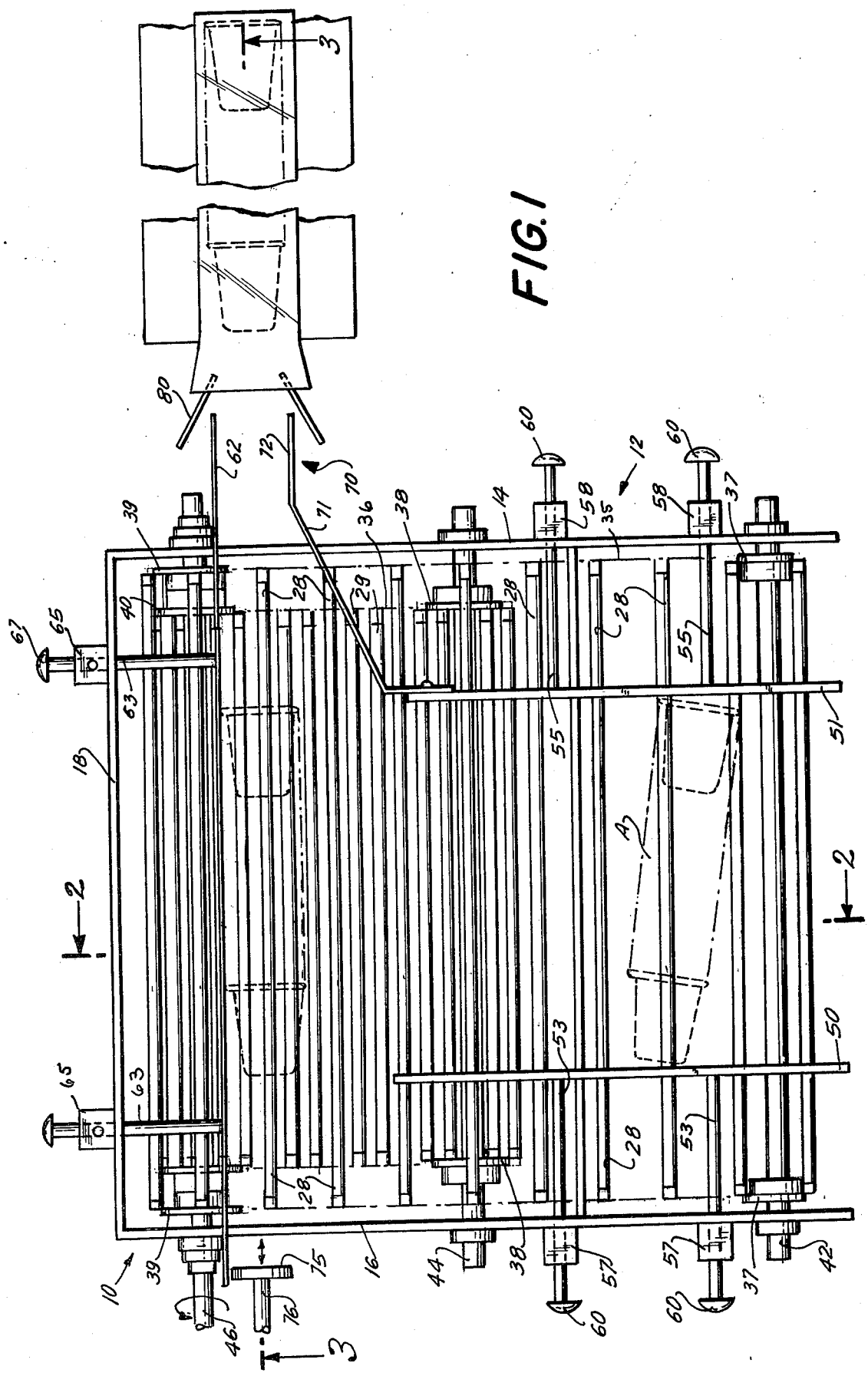
FIG. 1 is a top plan view of a conveyor made in accordance with the teachings of the invention, with the cylindrical articles to be conveyed shown in dash line as a stack of nested cups.
Figure 6:
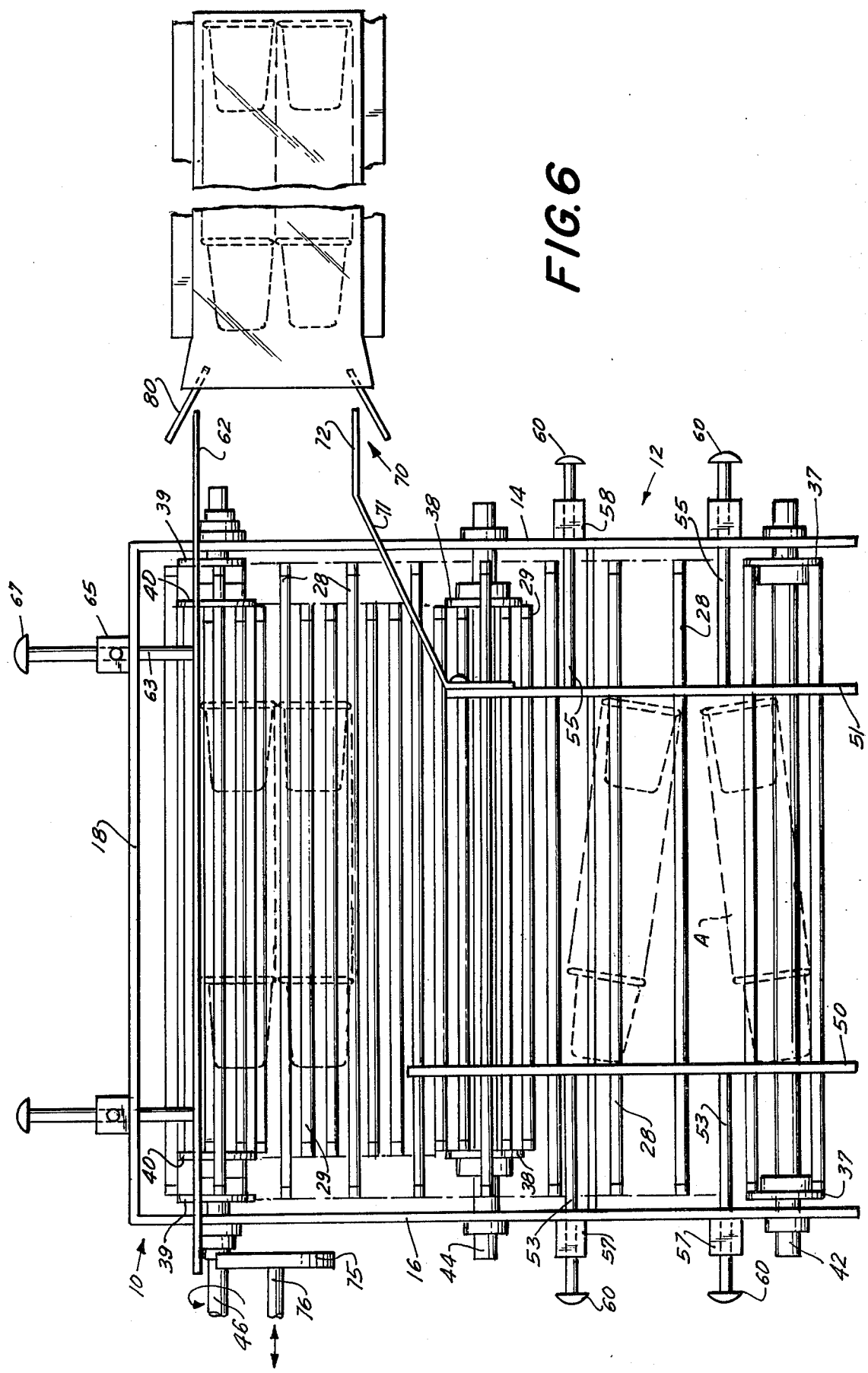
FIG. 6 is a top plan view of the conveyor of FIG. 1, showing the discharge guide plate oriented to permit simultaneous discharge of two cup stacks from the conveyor.

As illustratively shown in FIGS. 1 and 6, the conveyor 10 is formed with an elongate rectangular frame 12 having side rails 14 and 16 and an end rail 18. As will be understood by those skilled in art the art, though no end rail opposite end rail 18 is illustrated, such end rail is joined to the side rails 14 and 16 to provide the desired rectangular frame.

Figure 2:
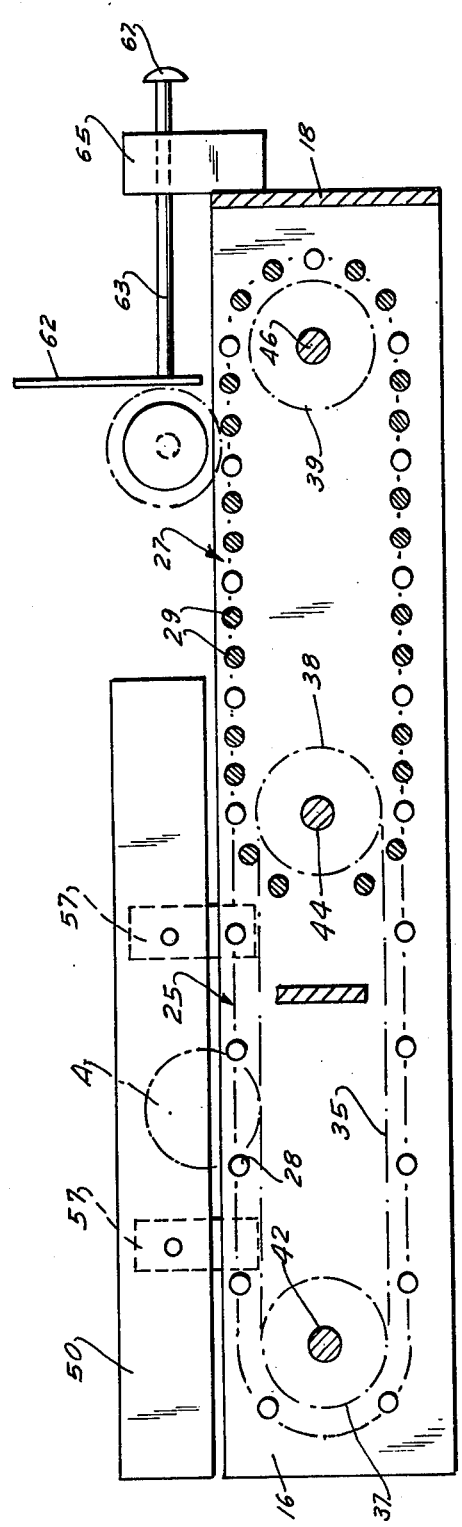
FIG. 2 is a cross-sectional elevational view on line 2—2 of FIG. 1.

Supported for movement between the frame members is a first flight conveyor 25 and a second flight conveyor 27, as best seen in FIG. 2. The flights 28 of first flight conveyor 25 are spaced apart a distance between 25% and 100% of the diameter of the articles "A" carried by the conveyor. The flights 29 (shown cross-hatched in FIG. 2) are positioned so that the space between these flights 29 is less than the inter-surface space between flights 28. Thus, as shown schematically in FIG. 2, the flights 29 of second conveyor 27 lie between and the upper surfaces thereof are in a plane with that of the flights 28 of first conveyor 25.

The flights 28 and 29, as best seen in FIGS. 3 and 4, are supported on arms 31, and 33, secured to sprocket chains 35 and 36 trained to ride over sprocket wheels 37, 38, 39 and 40, as best seen in FIGS. 2, 4 and 5. As best seen in FIG. 5, the flights 28 and 29 are (in moving along their upper run) maintained at a level above the level of their supporting chains 35 and 36, respectively, by means of arms 31 and 33. Chains 35 and 36 are of a conventional sprocket chain type trained to ride over sprocket wheels 37, 38, 39 and 40, as best seen in FIG. 1. Flights 28 of first flight conveyor 25 are supported on sprocket chain 35 trained to ride over sprocket wheels 37 and 39. Flights 29 of second flight conveyor 27, are supported on chain 36 trained to ride over sprocket wheel 38 and 40. As can be seen from FIG. 1, and as will be understood by those skilled in the art, the sprocket wheels 37, 38, 39 and 40 are mounted in pairs on axles 42, 44 and 46, arranged to extend across frame 12 and journaled for rotation in the side rails.

In the illustrated embodiment, shaft 46 is shown as a driving shaft coupled to appropriate drive means (not shown) such as an electric motor or the like. Rotation of shaft 46 causes sprocket wheels 39 and 40 to rotate as a result of the fact that sprocket wheels 39 and 40 are fixed to this drive shaft 46. As a result of the rotation of sprocket wheels 39 and 40, chains 25 and 27 are moved over sprocket wheels 37 and 38 which act as idlers.

The chains 35 and 36 are preferably of a bicycle chain type, as best seen in FIG. 4, with a plurality of links 47 coupled as illustrated in FIG. 4 by pins 48. As illustrated, a pair of links is spaced apart by a pair of pins, and the ends of each pair of links overlap the ends of an adjacent link pair, in conventional bicycle chain fashion to provide a sprocket chain subject to engagement by the sprocket teeth on wheels 37, 38, 39 and 40.

Arranged over first flight conveyor 25, are a pair of spaced guide rails 50 and 51, as best seen in FIG. 1, adjustably supported by slide rods 53 and 55 respectively (two of which are shown) for each of the guide rails. Slide rods 53 and 55 are slideably mounted in bushings 57 and 58 respectively, secured as by welding or the like to the side rails 16 and 14 of the conveyor frame 12, and adjusting handles 60 are formed on the free ends of the slide rods.

An end plate 62, as seen at the top of FIG. 1 is mounted on slide rods 63 extending through bushings 65 secured to end rail 18. Handle 67 on slide rod 63 facilitates adjusting of the end plate.

A lateral guide 70, having a funnel leg 71 and linear leg 72, is arranged as shown in FIG. 1 to define a discharge path for articles carried by the conveyor. A lateral pusher plate 75, as seen to the upper left in FIG. 1, is mounted on plunger rod 76 for transverse reciprocation across the conveyor.

A receiving chute 80 is provided along the path of travel defined by guide 70 to receive articles "A" fed over apron 82.

OPERATION

The aforedescribed conveyor is preferably fabricated of metal utilizing conventional metal forming and fabrication techniques to provide the frame of desired rigidity. Though it is preferred that metal be employed in forming the conveyor, as will be understood by those skilled in the art, a variety of other materials may be utilized and fabricated to provide a desired frame, having spaced sprocket wheels with sprocket chains supporting the flights in the orientation as above described, with the spacing between the flights of the first flight conveyor being greater than those of the flights of the second conveyor.

In use, articles which are illustratively shown as a stack of cups or the like are deposited on the first run of flights which are spaced apart a distance less than 100% and greater than 25% of the diameter of the cylindrical article deposited thereon. As a result of this flight spacing, the cylindrical article in being moved by the flights will fall between the flights of the first run, so that the axes of the cylindrical articles becomes parallel to that of the flights and perpendicular to the path of movement of the articles along the conveyor, as best seen in FIG. 1.

Upon reaching the second flight conveyor where the flights are more closely spaced and lie between the flights of the first conveyor, the plane of the bottom of the article is raised to a level above that of the conveyor surface, as best seen in FIG. 2. Since the articles now lie along the surface of the conveyor, upon reaching the end plate 78, the articles will not be subjected to a jiggling action as a result of having to override adjacent flights.

Pusher 75 is periodically reciprocated to discharge the articles reaching the end of the conveyor which have now been oriented with their axes parallel to the flights, and as best seen in FIGS. 1 and 3, may now be discharged into discharge chute 80 whence they may be bagged or otherwise packaged.

As can be seen in comparing FIG. 1 and FIG. 6, the guide rails 50 and 51 and lateral guide 70 may be adjusted to accommodate different lengths and widths of articles and/or groups thereof.

The above disclosure has been given by way of illustration and elucidation, and not by way of limitation, and it is desired to protect all embodiments of the herein disclosed inventive concept within the scope of the appended claims.

What is claimed is:

1. A packaging conveyor for cylindrical articles comprising: a first group of parallel flights with the space between adjacent flights less than 100% and greater than 25% of the diameter of the cylindrical articles conveyed so that the cylindrical articles will fall partly through the spacing between the flights on said first group of flights; said first group of flights extending from an upstream location to a downstream location; a second set of flights receiving the articles conveyed by the first group of flights, with the space between the second set of flights being greater than 0% and less than 100% of the space between adjacent flights of the first group of flights; said second set of flights intermesh with said first set of flights from an intermediate location to said downstream location so as to raise the level of the articles to lie on a plane permitting the articles to be laterally displaced from the flights; and a pusher member arranged to move across the flights at said downstream location.

2. A packaging conveyor as in claim 1, in which said first set of flights is carried on a first endless sprocket chain trained over a first pair of spaced sprocket wheels.

3. A packaging conveyor as in claim 2, in which the individual flights of said second set of flights lie between individual flights of said first set of flights adjacent the end of their run.

4. A packaging conveyor as in claim 3 in which said individual flights of said second set of flights is carried on a second endless sprocket chain carried over a second pair of spaced sprocket wheels.

5. A packaging conveyor as in claim 4 in which one of the sprocket wheels of said first pair of sprocket wheels is mounted on a shaft common with that of one of the sprocket wheels of said second pair of sprocket wheels.

6. A packaging conveyor as in claim 5, in which each set of flights is supported on at least a pair of laterally spaced sprocket chains.

7. A packaging conveyor as in claim 6, in which the spacing between the sprocket wheels of said spaced sprocket chains is such that the lateral spacing of the sprocket wheels supporting the flights forming said first set of flights is greater than the lateral spacing of the sprocket wheels supporting said sprocket chains supporting the flights forming said second set of flights.

8. A packaging conveyor as in claim 1, in which an end plate is adjustably positioned over said conveyor at the end of the desired path of travel of articles carried by said second set of flights.

9. A packaging conveyor as in claim 8, having a guide plate spaced from said end plate to define a laterally extending discharge path for articles pushed from said conveyor by said pusher member.

10. A packaging conveyor as in claim 9, in which a receiving chute is positioned adjacent the discharge end of said guide plate.

* * * * *